H. PULSE.
Seed Planter.
No. 70,896.
Patented Nov. 12, 1867.
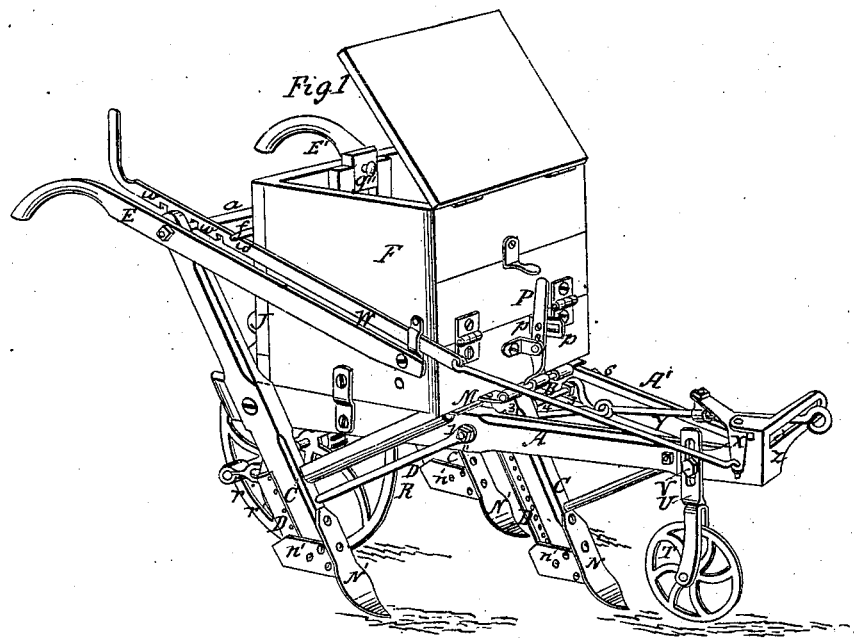
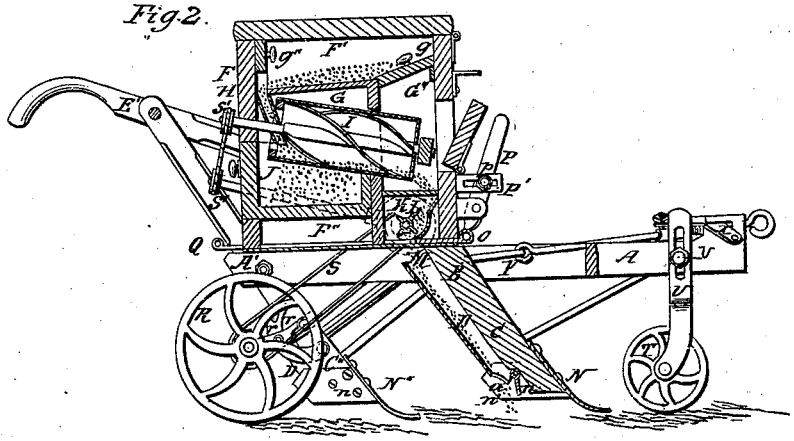

United States Patent Office.

HIRAM PULSE, OF ST. PAUL, INDIANA.

Letters Patent No. 70,896, dated November 12, 1867.

---

IMPROVEMENT IN GRAIN-DRILLS.

---

The Schedule referred to in these Letters Patent and making part of the same.

---

TO ALL WHOM IT MAY CONCERN:

Be it known that I, HIRAM PULSE, of St. Paul, Decatur county, Indiana, have invented a new and useful Improvement in Grain-Drills; and hereby declare the following to be a full, clear, and exact description thereof, reference being had to the accompanying drawings, making part of this specification.

My invention relates to improvements upon the implement patented by me February 12, 1867; and consists in the following device:

First. An arrangement of hopper or sliding door whereby the grain can be fed to the dropping mechanism without or without screening.

Second. An adjustable device for the seed-regulating slide.

Third. A cross-bolt constructed with six nuts for holding the beams and stand-sheath in proper relative position, and affording attachments for draught-rods.

Fourth. An arrangement of slotted hangers or brackets and segmental racks for adjusting the elevation of the rear wheel or tightening-belt at will.

Fifth. My invention further consists in notching the seeding-spouts at their rear sides, in combination with winged shares and valves or flaps, enabling the grain to get underneath the earth, and to be properly covered thereby without danger of the seeding-spouts becoming clogged.

Sixth. A cheat-drawer for catching and removing the cheat, chess, and other small grains.

Seventh. An arrangement of notched rod and spring for operating the adjustable clevis.

Eighth. A caster-wheel in front of the machine, adjustable in height, for the purpose of supporting the front end of the machine, and, in conjunction with the rear wheel, of regulating the penetration of the shares or drills.

In the accompanying drawings—

Figure 1 is a perspective view of a grain-drill embodying my invention.

Figure 2 is a sectional view of the same.

The beams A A' constitute essentially the frame of my machine. They are joined together firmly at their front ends, and are connected by a cross-bolt, B, provided with six nuts, 1, 2, 3, 4, 5, 6. Projecting downward and forward from the cross-bolt B and rear ends of beams A A', are the sheaths C C' C'', which carry at their rear sides conducting-tubes D for the grain, while at the upper ends of C' C'' are attached two handles, E E'.

The construction and arrangement of spout H, revolving screen I, grain-chamber K, agitator L, ducts M, ground-wheel R, and transmitting mechanism S, are substantially the same as exhibited in my patent of February 12, 1867.

The grain-box F is supported on the frame of the machine, and has at its upper part a grain-chamber, F', whose sloping floor forms the chute G down which the grain travels to the spout H. At the upper end of the chute G a passage, G', is provided, which is closed at will by door $g$, to allow of the grain being fed to the seed-dropping mechanism either with or with or without passing through the screen I. When it is desired to deposit the grain without screening, the door $g$ is slid over on to the chute G, and the sliding gate $g''$ lowered to stop the passage H, so as to compel all the grain fed to the hopper to pass through the throat G' at the front end of the screen-chamber F''. The ventage of the ducts M is regulated by a slide, O, operated by a lever, P, which can be retained in any position securely by means of the screw $p$ in the slotted bracket $p'$, and the slide Q permits of the supply being cut off from the rear of the machine. The rod W, which operates the draught-adjusting mechanism X Z Z, is notched at $w$, to fit over the rod $a$, and is kept in the notches by means of spring $f$. The cross-bolt B, by means of the six nuts 1, 2, 3, 4, 5, 6, firmly secures together the centre sheath C and beams A A', besides securing an attachment, as shown, for the draught-rod Y. J is an offal-drawer for collecting the cheat and other small refuse that escapes from the screen when in operation. The ventage of each seed-dropping duct D is notched at $a$, immediately in rear of shares N N' N'', and is provided with a valve, $n$, and side shares or wings, $n'$, for the purpose of preventing the clogging of the ducts, and for enabling the grain to get properly underneath the earth. The shaft of the rear wheel R is supported on brackets $r$ secured to the sheaths C' C'' at $c$, the brackets being also supported by slotted segmental arcs $r'$. By this device the wheel R can be elevated and depressed at will, to regulate the working depth of the shares. This device also admits of the driving-belt S being tightened without changing the elevation of the wheel R. A caster-wheel, T, is provided at the front end of the machine, fitted to a slotted and adjustable support, U, which can be secured in any desired position by means of a bolt, V.

I claim herein as new, and of my invention—

1. The upper box or hopper F, having the two doors $g$ $g''$ and throats H G', for optional discharge of the grain either through the screen or otherwise, as set forth.

2. The slides O and Q, adjusting-lever P, clamp $p$, and slotted bar $p'$, combined and arranged substantially as and for the purposes set forth.

3. The cross-bolt B and nuts 1, 2, 3, 4, 5, 6, in the described combination, with the beams A A', sheaths C C' C'', and draught-rod Y, for the purpose specified.

4. The slotted brackets $r$ and slotted segmental arcs $r'$, in combination with the rear wheel R and driving-belt or chain S, as and for the purpose specified.

5. The notched spouts D, in combination with the valves $n$ and winged shares N $n'$, for the purpose described.

6. In the described combination with the screen I and screen-chamber F' of my grain-drill, I claim the removable drawer J, for the purpose specified.

7. The notched rod W $w$ and spring $f$, for the purpose specified.

8. The caster-wheel T, slotted bracket U, and bolt V, for supporting the front end of the implement, in combination with the adjustable rear wheel R, as and for the purpose set forth.

In testimony of which invention I hereunto set my hand.

HIRAM PULSE.

Witnesses:
 GEO. H. KNIGHT,
 JAMES H. LAYMAN.